United States Patent Office 3,089,817
Patented May 14, 1963

3,089,817
DICHROSTACHYS GLOMERATA HYPOTENSIVE AGENT
Laurence W. Roth and Fred Keller, Northridge, Calif., assignors to Riker Laboratories, Inc., Northridge, Calif., a corporation of Delaware
No Drawing. Filed Mar. 7, 1960, Ser. No. 12,953
11 Claims. (Cl. 167—65)

The invention relates to a new therapeutic method for the lowering of blood pressure and new pharmaceutical compositions therefor and methods for the preparation thereof. More particularly it relates to a method for the treatment of hypertension in mammals by administering a composition containing as the essential hypotensive ingredient, *Dichrostachys glomerata* (Forsk.) Chiov. or kindred plants containing similar hypotensive principles; also to pharmaceutical compositions suitable for such treatments comprising said plant materials in dosage form and extracts and processes for the preparation of said extracts.

Many therapeutic methods for the treatment of hypertension have been developed hitherto, but so far these have been characterized by various undesirable side effects, many have had a short duration of action, and many compositions for this purpose have been difficult and expensive to prepare.

We have discovered a new method of treatment of hypertension of outstanding therapeutic value comprising administering a composition containing as the essential hypotensive ingredient, plant material or extracts obtained from various species of the genus Dichrostachys and kindred plants, more particularly *Dichrostachys glomerata*, as listed in Ann. Bot. Roma, XIII, 409 (1915). This species is a shrub or small tree with axillary spines; leaves bipinnate; pinnae about 10 pairs, opposite, with a long rod-like gland between each; leaflets numerous, rather variable in size, linear-oblong, up to 8 mm. long and 2.5 mm. broad, slightly pubescent; rhachis pubescent; spikes usually about 6-8 cm. long, pedunculate, the upper bisexual flowers yellow, the lower neuter ones pink or mauve; fruits crowded in a head, undulate or much curved, glabrous, shining; and is widespread in tropical Africa, and in parts of South Africa. We have also invented novel pharmaceutical compositions suitable for such treatment, in particular extracts and dosage forms and processes for their extraction and/or formulation. In so far as is known, no one heretofore has discovered that these materials have hypotensive action.

One object of the invention as indicated in the foregoing is to provide the medical profession with an improved method of lowering blood pressure by the administration of compositions containing *Dichrostachys glomerata* or the active principles thereof.

Another object of the invention is to provide therapeutic compositions suitable for the aforesaid method of treatment.

Another object of the invention is to provide a process for the formulation of the aforesaid therapeutic compositions.

Another object of the invention is to provide a process for the extraction of the hypotensive principles from plant material of the species *Dichrostachys glomerata* and kindred plant materials.

Another object of the invention is to provide extracts containing the desirable hypotensive principles from the aforementioned plant materials, and also such extracts in substantially pure form.

Other objects will become apparent from the following specification in which *Dichrostachys glomerata* is taken as typical of such plant materials containing such hypotensive principles.

According to the present invention it has been found that *Dichrostachys glomerata* plant material on oral administration to dogs produced a substantial lowering of the mean arterial blood pressure (MAP) of long-lasting duration. Furthermore there was no evidence of sedation, nictitating membrane prominence, diarrhea or change in body temperature; whilst blood pressure responses to histamine and epinephrine remained unchanged. Similarly certain extracts of *Dichrostachys glomerata* plant material on parenteral administration in dogs showed an immediate hypotensive action lasting as much as several hours with no undesirable side effects.

We have also established the effectiveness of our novel compositions in lowering both systolic and diastolic arterial blood pressure by direct arterial measurements in the conscious animal. The results were in close agreement with those obtained under pentobarbital anesthesia.

We have further found that extracts of particular therapeutic value may be obtained from plant material of the species *Dichrostachys glomerata* and kindred plant materials by extracting said plant material with a hydrophilic solvent.

The plant material to which the process is applied may be fresh or dried, and may comprise any portion of the plant such as leaves, stems, bark or roots. We prefer to use the dried leaves. The plant material is ground or cut, as necessary, to a fairly fine state.

Extraction may be carried out by any mode of extraction such as maceration, percolation, digestion, infusion or decoction.

Hydrophilic solvents which may be employed include water, lower alkanols such as methanol, ethanol, n-propanol, iso-propanol, n-butanol or an iso-butanol, hydroxylated lower alkyl ethers such as ethylene glycol monomethyl ether, lower ketones such as acetone or 3-pentanone, lower esters such as methyl acetate or ethyl propionate, and cyclic ethers such as dioxane, tetrahydrofurane or combinations thereof.

The solvent may be used cold, at reflux, or at any intermediate temperature.

One or more additional extractions of the plant material may be made and the extracts combined to increase the yield of active principle. The volume of solvent used for each extraction is usually from 5 to 30 times the weight of plant material.

The active materials of our invention may be administered in a variety of forms. Various vehicles and diluents are employed which may be solid or liquid materials for oral use or sterile parenteral liquids. The compositions may take the form of tablets, powders, syrup elixirs, capsules or other dosage forms which are particularly useful for oral ingestion, or aerosol compositions for inhalation therapy containing the active principle in a self-propelling fluid, such as a liquefied fluoro-lower-alkane.

The percentage of active material in our compositions may be varied. It is necessary that the active material constitute a proportion such that a suitable dosage will be obtained. Obviously a number of unit dosage forms may be administered at about the same time. We prefer to make unit dosage forms each containing from about 5 mgm. to about 500 mgm. of the extract for oral use. For parenteral use we prefer to administer unit dosage forms each containing from about 10 mgm. to about 200 mgm. of the extract.

Vehicles suitable for oral compositions are hard or soft gelatin capsules, solid diluents and/or manipulating or tableting adjuvants such as starch, calcium stearate, lactose or like materials which are compatible with the active materials.

The following examples are given by way of illustration and are not to be considered as the sole embodiments of this invention or as limiting the scope of the invention; variations may occur from these examples and still give satisfactory results.

Example 1

Seven healthy dogs ranging between 6 and 25 kilograms in weight were weighed to the nearest 100 grams.

Dried leaves of *Dichrostachys glomerata* were ground to a fine powder and the powder was weighed into hard gelatin capsules ranging from veterinary sizes 14 to 7, to provide for each dog capsules containing 1 gram per kilogram body weight.

Heart rates and mean arterial pressures for each dog were determined (day 0).

One capsule was administered orally to the corresponding dog each day for 5 days only. Two hours after the last dose heart rate and mean arterial pressure determinations were repeated (day 5).

The animals were anesthetized by intravenous pentobarbital to plane 2 of stage III, and at least 20 minutes were allowed to elapse before femoral artery puncture was made with a 20-gauge hypodermic needle connected to a Sanborn Electromanometer properly calibrated, and using a Poly-Viso recording apparatus, to determine the heart rate and means arterial pressure. These determinations were repeated at intervals of at least one week after the last dose.

The results obtained are reported in Table I below.

|  | Day 0 | | Day 5 | | Day 12 | | Day 23 | | Day 40 | | Day 48 | |
|---|---|---|---|---|---|---|---|---|---|---|---|---|
|  | HR | MAP | HR | MAP | HR | MAP | HR | MAP | HR | MAP | HR | MAP |
| Mean | Control 159 ±31 | 118 ±18 | 129 ±10 | 84 ±8 | 110 ±17 | 81 ±4 | 129 ±24 | 82 ±10 | 133 ±33 | 90 ±9 | 118 ±16 | 111 ±9 |

No side effects such as diarrhea, emesis, sedation, change in body temperature or nictitating membrane prominence were observed. It was further observed that blood pressure responses to histamine and epinephrine remained unchanged; right peripheral vagal response and carotid occlusion response were normal. The long-lasting duration of the effect of the drug until at least the 40th day is noteworthy. The return to normal level at the 48th day is indicative of lack of permanent untoward effect on normal physiological function.

For comparison corresponding data for dogs administered .75 mg./kg./day of Rauwiloid, a selected extract of *Rauwolfia serpentina* Benth. for five days are reported in Table II below:

|  | Day 0 | | Day 6 | | Day 23 | |
|---|---|---|---|---|---|---|
|  | HR | MAP | HR | MAP | HR | MAP |
|  | 144 ±7 | 106 ±14 | 69 ±15 | 77 ±17 | 137 ±12 | 123 ±9 |

These results show that a composition of and process of using *Dichrostachys glomerata* for lowering blood pressure are unexpectedly and markedly superior to those of *Rauwolfia serpentina*, the most eminent of corresponding prior art products known hitherto.

Example 2

Three pounds of fresh leaves and stems of *Dichrostachys glomerata* were ground with solid carbon dioxide to a coarse powder and the solid carbon dioxide allowed to evaporate. The powdered plant material was extracted with 8 liters hot water on the steam bath for 2 hours. The extract was separated by filtration, then shell-frozen and lyophilized; yield 58 grams.

This extract was tested in mice for gross changes. A 15% solution of the extract in water was administered intraperitoneally. No reactions were observed. The acute $LD_{50}$ was found to be 1250 mg./kg.

The extract was tested in dogs for cardiovascular effects. Two dogs anesthetized with pentobarbital and vagotomized were given intravenously 5 mg./kg. of this extract in 0.9% saline solution. Two more similarly prepared dogs were given 10 mg./kg. Blood pressure response to acetylcholine was reversed in three out of four dogs; blood pressures fell, averaging 21 mm. Hg on the low dose and 40 mm. Hg on the high dose.

Example 3

Ground dry *Dichrostachys glomerata* plant material (2 kg.) was extracted with methanol (14 liters), on a steam bath under reflux for 1¼ hours. The extract was separated by filtration. The solvent was removed by evaporation in vacuo. Yield 4.78%.

The product is mixed with calcium stearate (1%), and weighed into hard gelatin capsules of veterinary size 11 or 12, to provide for each dog capsules containing 141 mg./kg./day.

Eight dogs were given the capsules orally each day for 5 days following which drug administration was discontinued and heart rates and mean arterial pressures for each dog were measured as described in Example 1. The results obtained are reported in Table III below:

|  | Day 0 | | Day 5 | | Day 12 | | Day 20 | | Day 39 | |
|---|---|---|---|---|---|---|---|---|---|---|
|  | HR | MAP | HR | MAP | HR | MAP | HR | MAP | HR | MAP |
| Mean | Control 150 ±25 | 115 ±15 | 136 ±16 | 87 ±5 | 112 ±42 | 93 ±25 | 151 ±12 | 97 ±19 | Return to normal 138 One dog only | 114 |

There was no sedation, diarrhea, emesis or nictating membrane prominence.

This extract was also administered in the dog intravenously as described in Example 2. The average result obtained at a dose of 10 mg./kg. was a fall in mean arterial blood pressure from 137 mm. Hg to 80 mm. Hg, lasting more than 30 minutes.

Example 4

Two kg. of *Dichrostachys glomerata* plant material was extracted with two 16 liter portions of hot isopropanol under similar conditions to those of Example 3 yielding 2.80% of extract from the first extraction and 0.65% from the second extraction. The extracts were combined.

This extract was encapsulated and given orally to four dogs in five day feeding tests in the manner described in Example 3. The results are presented in Table IV below:

|      | Day 5 | | Day 17 | | Day 30 | |
| --- | --- | --- | --- | --- | --- | --- |
|      | HR | MAP | HR | MAP | HR | MAP |
| Mean | 128 ±18 | 99 ±18 | 136 ±28 | 89 ±19 | 116 ±21 | 106 (3 dogs) ±19 |

The results of intravenous administration of this extract in the dog were that a dose of 10 mg./kg. caused an average fall in mean arterial blood pressure from 123 mm. Hg to 67 mm. Hg lasting about an hour.

*Example 5*

Two kg. of dry *Dichrostachys glomerata* was extracted twice with 20 liters of hot water under similar conditions to those of Example 2. The solvent was removed by distillation in vacuo to yield 133 gm. (6.6%) of solid extract.

This extract was encapsulated and given orally to four dogs in five days feeding tests in the manner described in Example 3. The results are presented in Table V below:

|      | Day 5 | | Day 17 | | Day 30 | |
| --- | --- | --- | --- | --- | --- | --- |
|      | HR | MAP | HR | MAP | HR | MAP |
| Mean | 122 ±22 | 108 ±17 | 140 ±18 | 88 ±15 | 108 ±27 | 91 ±6 |

On intravenous administration of this extract in the dog, the results were that a dose of 10 mg./kg. caused an average fall in mean arterial blood pressure from 120 mm. Hg to 82 mm. Hg lasting longer than 30 minutes.

*Example 6*

20 kg. ground *Dichrostachys glomerata* was slurried with 30 liters water and stirred for 1 hour at 20° C. The solids were then removed by filtration. The filtrate was taken to dryness at 45–55° C. under vacuum (100 mm. Hg). Yield 2.10 kg. (10.5%).

On administration of this extract at 10 to 20 mg./kg. in aqueous solution intravenously to eight dogs an immediate fall in blood pressure resulted, lasting from 30 minutes to 1 hour.

*Example 7*

100 gm. ground dry *Dichrostachys glomerata* was extracted twice with 1 liter portions of acetone by slurrying for 1 hour on a steam bath. The filtrate was taken to dryness. Yield 2.3%.

On administration of 10 mg./kg. in propylene glycol/ethanol solution intravenously to three dogs an immediate and marked fall in blood pressure lasting up to one hour resulted.

*Example 8*

100 gm. ground dry *Dichrostachys glomerata* was extracted with 2 liters of ethyl acetate following the procedure described in Example 7. Yield of solids 1.5%.

On administration of 5 mg./kg. in propylene glycol/ethanol solution 1:1 by volume intravenously in the dog a distinct fall in blood pressure for more than 30 minutes resulted.

The average drop in mean arterial blood pressure was from 114 mm. Hg to 95 mm. Hg lasting over 30 minutes.

Extractions using other hydrophilic solvents and intravenous administrations in dogs were carried out using the procedure of Example 7. A significant fall in blood pressure was observed at dosages ranging from 5 to 15 mg./kg. The results are presented in Table VI below:

| Solvent | Yield (percent) | Dose (mg./kg.) |
| --- | --- | --- |
| N-butanol | 3.4 | 15 |
| Isopropanol (cold) | 0.52 | 5–7 |
| Dioxane (warm) | 3.4 | 10 |
| Acetonitrile (hot) | 1.3 | 10 |
| Tetrahydrofuran | 3.8 | 10–15 |
| Methyl Cellosolve (ethylene glycol monomethyl ether) | 9.0 | 10 |

Fractions of increased potency may be obtained (1) by precipitation of relatively impotent material by addition of lower alkanols to an aqueous extract of *Dichrostachys glomerata* (2) by chromatography of an aqueous extract of *Dichrostachys glomerata* on adsorbent materials such as ion exchange resins for example, Amberlite IRC–50 in the hydrogen form and subsequent elution with acidic methanol.

For oral administration tablets may be made of the following formulations:

*Example 9*

| | |
| --- | --- |
| Ground leaves of *Dichrostachys glomerta* | 500 mg. |
| Corn starch (as 15% paste) mg. (starch) | 43 |
| Calcium stearate mg. | 2.5 |
| Total mg. | 545.5 |

100 gm. of ground leaves of *Dichrostachys glomerta* (14 mesh size) was granulated with a paste of starch containing 15% of starch to a normal granulation consistency. The mixture was passed through a number 8 mesh. It was then dried at 40° C. over night. The dried granules were passed through a number 16 mesh, the calcium stearate was mixed in and the mixture was compresed into 7/16 inch flat-faced tablets containing about 500 mg. of drug per tablet.

*Example 10*

| | Mg. |
| --- | --- |
| Extract of *Dichrostachys glomerata* | 150 |
| Calcium stearate | 1.5 |

A homogeneous mixture is prepared from the above-mentioned ingredients. This mixture is compressed in a quarter-inch standard cup-punch with bisect. The tablets produced will break apart on finger pressure but hold together with regular handling.

We claim:

1. A method of lowering blood pressure which comprises administering a composition containing as the hypotensive ingredient material from the plant *Dichrostachys glomerata*.

2. A method of lowering blood pressure which comprises administering a composition containing as the hypotensive ingredient *Dichrostachys glomerata*.

3. A method of lowering blood pressure which comprises administering a composition containing as the hypotensive ingredient a hydrophilic solvent extract of *Dichrostachys glomerata*.

4. A method of lowering blood pressure which comprises administering a composition containing as the hypotensive ingredient a hydrophilic solvent extract derived by treating *Dichrostachys glomerata* plant material with a hydrophilic solvent.

5. A process for preparing an extract useful for lowering of blood pressure which comprises extracting plant material of the plant *Dichrostachys glomerata* with a hydrophilic solvent and separating the resultant extract.

6. A process for preparing an extract useful for lowering of blood pressure which comprises extracting *Dichrostachys glomerata* plant material with a hydrophilic solvent and separating the resultant extract.

7. A process as defined in claim 6, wherein the hydrophilic solvent is water.

8. A process as defined in claim 6, wherein the hydrophilic solvent is a lower alkanol.

9. A pharmaceutical preparation for internal use including injection comprising a hydrophilic solvent extract of plant material of the plant *Dichrostachys glomerata* and a pharmaceutical carrier.

10. A pharmaceutical preparation for internal use including injection comprising in dosage form a hydrophilic solvent extract of plant material of the plant *Dichrostachys glomerata* and a pharmaceutical carrier.

11. A pharmaceutical preparation for lowering blood pressure comprising as an essential hypotensive ingredient a hydrophilic solvent extract of *Dichrostachys glomerata* plant material and a pharmaceutical carrier.

No references cited.